(12) United States Patent
Brown et al.

(10) Patent No.: US 9,929,921 B2
(45) Date of Patent: *Mar. 27, 2018

(54) TECHNIQUES FOR WORKLOAD TOXIC MAPPING

(71) Applicant: Micro Focus Software Inc., Provo, UT (US)

(72) Inventors: Jeremy Ray Brown, Bluffdale, UT (US); Jason Allen Sabin, Lehi, UT (US); Nathaniel Brent Kranendonk, Springville, UT (US); Kal A. Larsen, Springville, UT (US); Lloyd Leon Burch, Payson, UT (US); Matthew Holt, Provo, UT (US); Michael John Jorgensen, Mapleton, UT (US); Michael Fairbanks, Lindon, UT (US); Chad Buttars, Pleasant Grove, UT (US)

(73) Assignee: Micro Focus Software Inc., Provo, UT (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/592,592

(22) Filed: Jan. 8, 2015

(65) Prior Publication Data
US 2015/0120921 A1    Apr. 30, 2015

Related U.S. Application Data

(63) Continuation of application No. 13/220,034, filed on Aug. 29, 2011, now Pat. No. 8,949,832.

(51) Int. Cl.
*H04L 12/26* (2006.01)
*G06F 11/30* (2006.01)
*G06F 11/34* (2006.01)
*H04L 12/58* (2006.01)

(52) U.S. Cl.
CPC ............ *H04L 43/04* (2013.01); *G06F 11/301* (2013.01); *G06F 11/302* (2013.01); *G06F 11/3006* (2013.01); *G06F 11/3093* (2013.01); *G06F 11/3409* (2013.01); *H04L 51/08* (2013.01); *G06F 11/3055* (2013.01)

(58) Field of Classification Search
None
See application file for complete search history.

(56) References Cited

U.S. PATENT DOCUMENTS

| 7,006,824 | B1 | 2/2006 | Tse et al. |
| 7,599,969 | B2 | 10/2009 | Mignet et al. |
| 7,664,847 | B2 | 2/2010 | Colrain et al. |

(Continued)

*Primary Examiner* — Mehran Kamran
(74) *Attorney, Agent, or Firm* — Schwegman Lundberg & Woessner, P.A.

(57) ABSTRACT

Techniques for toxic workload mapping are provided. A state of a target workload is recorded along with a configuration and state of an environment that is processing the workload. Micro valuations are taken, via statistical sampling, for metrics associated with the workload and for different combinations of resources within the environment. The sampling taken at micro second intervals. The valuations are aggregated to form an index representing a toxic mapping for the workload within the environment. The toxic mapping is mined, in view of policy, to provide conditions and scenarios that may be deemed problematic within the workload and/or environment.

15 Claims, 5 Drawing Sheets

(56) References Cited

U.S. PATENT DOCUMENTS

| | | | |
|---|---|---|---|
| 7,698,530 B2 | 4/2010 | Flemming et al. | |
| 7,698,531 B2 | 4/2010 | Flemming et al. | |
| 7,716,006 B2 | 5/2010 | Coskun et al. | |
| 7,788,670 B2 | 8/2010 | Bodas et al. | |
| 2008/0221918 A1* | 9/2008 | Petersen | G06Q 50/22 705/2 |
| 2008/0270595 A1* | 10/2008 | Rolia | G06F 11/3414 709/224 |
| 2010/0107172 A1* | 4/2010 | Calinescu | G06F 9/5061 718/104 |
| 2010/0306163 A1* | 12/2010 | Beaty | G06F 9/5077 706/52 |
| 2010/0318827 A1* | 12/2010 | Shah | G06F 1/3203 713/324 |
| 2011/0032833 A1* | 2/2011 | Zhang | H04L 45/70 370/252 |
| 2011/0041126 A1* | 2/2011 | Levy | G06F 9/5072 718/1 |
| 2011/0078102 A1 | 3/2011 | Yuyitung et al. | |
| 2011/0153824 A1* | 6/2011 | Chikando | G06F 9/5088 709/226 |
| 2012/0005683 A1* | 1/2012 | Bower, III | G06F 9/5094 718/103 |
| 2012/0005685 A1* | 1/2012 | Chen | G06F 9/5072 718/104 |
| 2012/0011378 A1* | 1/2012 | Dalton | G06F 11/3062 713/300 |
| 2012/0030341 A1* | 2/2012 | Jensen | H04L 67/2804 709/224 |
| 2012/0116836 A1* | 5/2012 | Flores | G06Q 10/0633 705/7.27 |
| 2012/0130936 A1* | 5/2012 | Brown | G06N 5/048 706/52 |
| 2012/0130988 A1* | 5/2012 | Nica | G06F 17/30463 707/718 |
| 2012/0167094 A1* | 6/2012 | Suit | G06F 11/3452 718/100 |
| 2012/0216135 A1* | 8/2012 | Wong | G06F 9/45533 715/764 |
| 2012/0232864 A1* | 9/2012 | Devarakonda | G06Q 10/06 703/2 |
| 2012/0254269 A1* | 10/2012 | Carmichael | G06F 17/30094 707/827 |
| 2012/0259978 A1* | 10/2012 | Petersen | G06Q 50/22 709/224 |
| 2012/0324091 A9* | 12/2012 | Raleigh | H04L 41/0893 709/224 |
| 2012/0324114 A1* | 12/2012 | Dutta | G06F 9/5066 709/226 |
| 2012/0331318 A1* | 12/2012 | Chan | G06F 9/5094 713/320 |
| 2013/0007503 A1* | 1/2013 | Anaya | G06F 11/2035 714/4.1 |
| 2013/0014107 A1* | 1/2013 | Kirchhofer | G06F 9/5083 718/1 |
| 2013/0055265 A1 | 2/2013 | Brown et al. | |
| 2015/0120921 A1* | 4/2015 | Brown | G06F 11/3006 709/224 |

* cited by examiner

TECHNIQUES FOR WORKLOAD TOXIC MAPPING

This application is a continuation of U.S. patent application Ser. No. 13/220,034, filed on Aug. 29, 2011, which is set to issue as U.S. Pat. No. 8,949,832 on Feb. 3, 2015, and which is incorporated herein by reference in its entirety.

BACKGROUND

Cloud computing is rapidly changing the Internet into a collection of clouds, which provide a variety of computing resources, storage resources, and, in the future, a variety of resources that are currently unimagined.

One issue with respect to virtualization is that when an enterprise offloads processing of one of its applications to a cloud environment and then subsequently experiences performance issues, the problem can be very difficult to track down. It may be that the problem is: with the enterprise's application, with the cloud provider's environment, or with a combination of the application and the environment.

In fact, some cloud providers may not provide many details at all to an enterprise as to the configuration of its environment; viewing this information as proprietary in nature. The actual environment can be very complex with many resources interacting with one another; so, the enterprise that deploys its applications to such an environment feels as if it is dealing with a black box, which is fine when things run smoothly but obviously problematic when things do not run smoothly.

Most metric-based performance tools provided in the industry lack sufficient detail to resolve where performance bottlenecks lie. That is, the existing tools do little beyond indicating how long (usually in seconds or minutes) that something processes. The actual dependencies occurring within the environment are not specified and any in depth analysis requires customized programming and often assistance of the cloud provider.

It can be particularly frustrating for an Information Technology (IT) department to spend a tremendous amount of human resources and time to track down a performance bottleneck associated with an enterprise's application in a cloud environment only to eventually learn that the real issue was with a particular resource or particular configuration of the cloud being used.

Once a cloud provider's culpability is identified and confirmed, the cloud provider will usually resolve the issue but not reimburse the enterprise for its efforts and that resolution does little to appease the customers of the enterprise that became frustrated with the enterprise while the performance issues were still lingering. In fact, the reputation of the enterprise may have already been irreparably damaged in the customer community. Issues such as this is one of many reasons many enterprises have not completely embraced cloud computing.

SUMMARY

Various embodiments of the invention provide techniques for toxic workload mapping. Specifically, a method for toxic workload mapping is presented.

A workload state for an executing workload and a processing environment state for a processing environment that the workload is executing within are acquired. Next, micro measurements are taken for the workload, the processing environment, resources within the processing environment, and combinations of: the workload, the processing environment, and the resources. Finally, the micro measurements are mapped in a toxic map to be associated with the workload, the workload state, the processing environment, the processing state, the resources, and the combinations.

DETAILED DESCRIPTION

Figure 1:
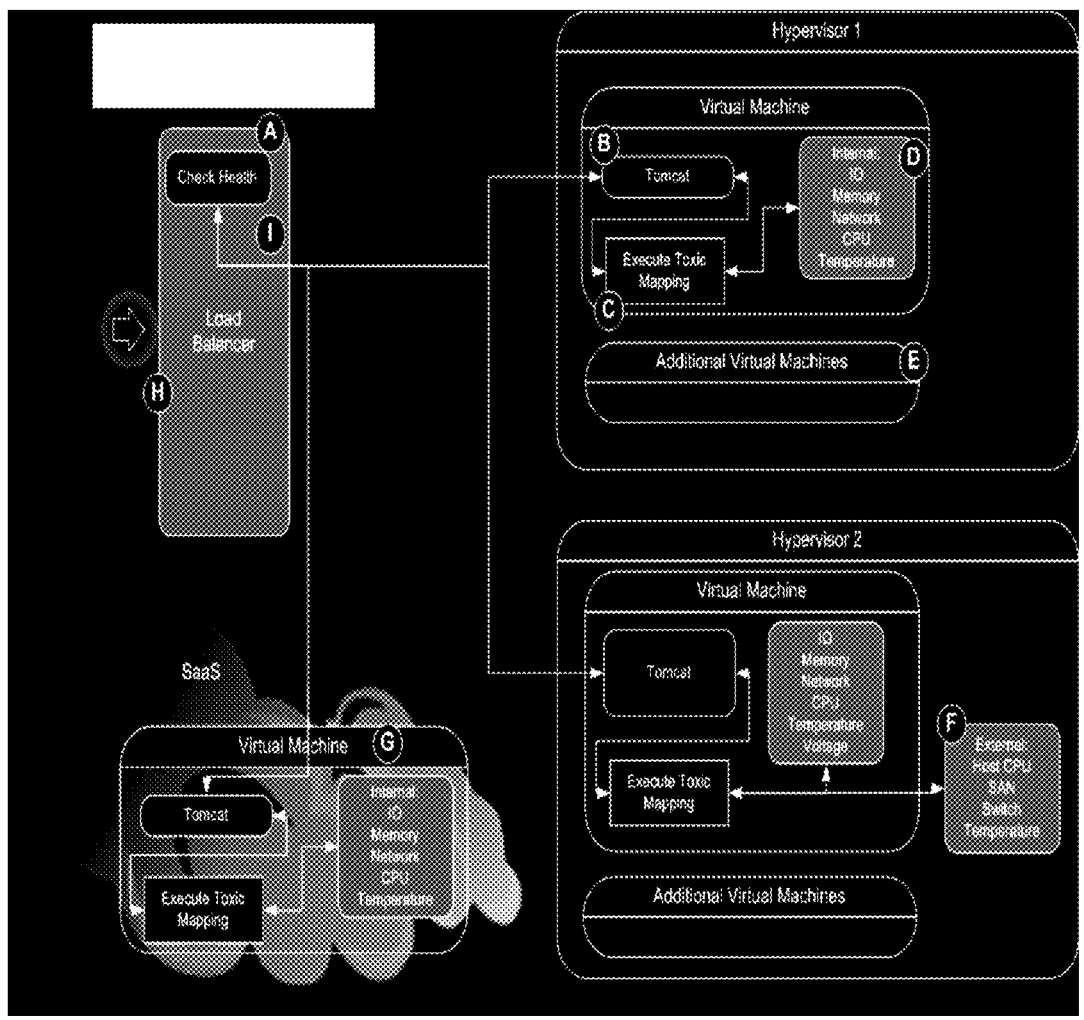
FIG. 1 is a diagram of an example architecture for toxic workload mapping, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "workload" as used herein refers to a special type of resource, such as a Virtual Machine (VM), an Operating System (OS), a hardware device, an agent, a service, and/or an application.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-5.

FIG. 1 is a diagram of an example architecture for toxic mapping of cloud resources, according to the techniques presented herein. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured to execute the components.

The FIG. 1 is presented with reference to a variety of specific example situations that an enterprise utilizing cloud environments can encounter. These are presented for purposes of illustration only as other situations can occur as well and still benefit from the techniques presented herein and below.

Moreover, the processing depicted from the architecture of the FIG. 1 can be implemented as a separate agent or alternatively as distributed processing embedded in existing applications or services that are modified and enhanced to perform the depicted and described below processing.

The initial notion is take the current state of software (a type of resource, such as a service, a workload, an application, a VM, or even an entire system) and then evaluate an environment for that software and gauge that environment. This provides a unique look at how the software is running and describes how the workload is able to run the software. Once these two parts of the equation are obtained, one can determine how the software will run independent of the platform that is running the software.

The existing state of the industry is such that one can look at many numbers that show the current state of a piece of software (such as a workload) but one still does not know what is happening on that workload in comparison to its environment. The techniques herein utilize benchmarking with micro values to show how the system (environment) is responding to workload. Intelligent Workload Management (IWM) is only useful when one has the right data so that one can determine the next step in the management of particular workloads.

Existing utilities can be used to collect measurements and deliver the status but the techniques herein improve upon these capabilities as is demonstrated herein and below. Also the ability to capture the state of a machine/workload exists but in the context of the techniques presented herein novel processing is achieved.

That is, the techniques herein provide a unique combination of mapping micro measurements and combining those micro measurements with a workload state to produce a product for purposes of a real-time evaluation. Some embodiments herein also uses the data collected and generated over time for influencing the usage of the workload in an enterprise datacenter and for building or generating a good story (history or even trend) for managing workloads across heterogeneous environments (e.g., heterogeneous clouds, etc.).

Now referring to the FIG. 1 and its processing. The processing at A is where the technique starts with a load balancer. The first thing that happens with the load balancer is a health check is taken against the application/product being tracked. In the sample illustration presented in the FIG. 1, the health check processing occurs against a sample application using Tomcat (an open source servlet container developed by Apache Software Foundation (ASF)). At B, a call against the Tomcat is made to make sure the application being tracked is up. At C, the toxic mapping utility executes to validate what is happening in the application (workload). The validation shows what is happening in the current state of the workload.

At D, the current state of the workload is evaluated and micro measurements are initiated. Specifically, effective micro valuations, which are more than just traditional taken measurements. The micro valuations (herein and below) take a sampling of the different resources in conjunction of each other within the environment, then summations of these micro values are taken and an index or quantifier is built that assists in subsequent evaluations.

There are several options to acquire the micro valuations, such as automatically and/or by making measurements upon specific actions performed by the workload (achieved via rules that break down what is happening in the workload on an action level of detail). In some cases, a user can organize and define the micro valuations for the workload with various configurations of the code or pieces of the code associated with the workload. In any given scenario, the micro valuations obtained are delivered to a summation utility to identify how the environment is performing.

It is to be noted that the measurements are taken at microsecond intervals for evaluation instead of trying to time everything to make evaluations and having so much data that one cannot tell which part is having issues in the environment. Once the final index or quantifier is determined, calculations for toxic mapping are then made.

Regardless of how the rest of the VMs are running at E, data on the performance of the workload and reporting on any toxic mapping can be provided back to the application for purposes of influencing the load balancing. This is reported back, via I, which is on the load balancer and can be further used for delivering to a customer a best response time and solution.

At F, external sources are used for making micro measurements instead of relying upon only internally collected values. The processing can then inspect a time a request takes to be answered or can then inspect a response time for a ping operation for purposes of gauging how fast the system is running or actually use a processing command through an Application Programming Interface (API) to determine the status of the VM.

A second example situation also starts at the same point at A in the FIG. 1 and goes to a second hypervisor (Hypervisor 2 in the FIG. 1) that follows the same processing as the first hypervisor (Hypervisor 1 in the FIG. 1) with another addition of external benchmark/validation on the physical hardware. This allows evaluation of the overall performance and uses the performance metrics in averages to identify various situations, such as a situation in which an entire box has started to slow down.

The last presented example is one in which the VM is running inside a Software as a Service (SaaS) environment where the Tomcat application is running. The placement of the workload, at G, is a different deployment but it shows the power of the technique presented to provide data on expected output independent of the particular deployment. The resulting toxic mapping gives data on where problems are and influences how the service (workload) is used for the end user.

Figure 2:
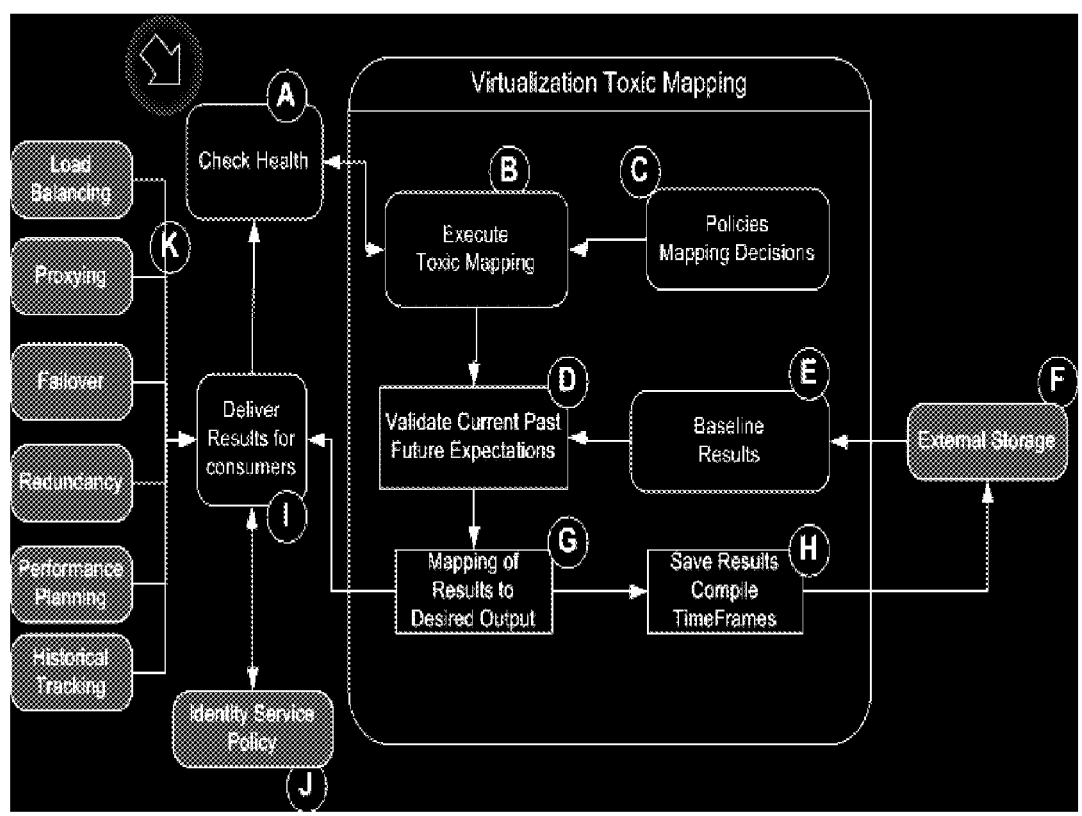
FIG. 2 is a diagram of another example architecture for toxic workload mapping, according to the techniques presented herein.

FIG. 2 is a diagram of another example architecture for toxic mapping of cloud resources, according to the techniques presented herein. Again it is noted that the FIG. 2 is presented for purposes of illustration and comprehension. It is to be understood that other architectural arrangements can be used to achieve the teachings presented herein and below.

The components of the FIG. 2 are implemented in non-transitory and processor-readable storage medium and are executed on physical processors on one or more networks. Each processor specifically configured to execute the components.

The FIG. 2 is presented with reference to a variety of specific example situations that an enterprise utilizing cloud environments can encounter. These are presented for purposes of illustration only as other situations can occur as well and still benefit from the techniques presented herein and below.

The FIG. 2 shows how the invention can be implemented within a sample environment. The architecture of the FIG. 2 builds on the architecture of the FIG. 1 in that the FIG. 2 shows how the data from toxic mapping can be consumed independent of where the workload is running.

Again, the processing associated with the FIG. 2 can be embedded in various other applications, services, and/or systems or the processing can be independently implemented as an agent that delivers data and that can produce a mapping of how its environment is being affected.

The processing of A mirrors the FIG. 1, where a health status for the workload is obtained. The workload toxic mapping utility is run on the system to validate what is happening in real time. B provides similar logic processing as was described in the FIG. 1. The processing at C determines a more powerful configuration (from that which was described with the FIG. 1) by using policies to make decisions. At D, a validation is performed to validate against future plans and past data. At E, baselines are stored to compare against the system and the external storage. At F, the data is being retained. At G, the toxic mapping is translated into a format that can be consumed by the services at K. At H, the data is saved off to the external storage. At J, control is enforced as to whom can access what part of the data; and the results are also finally delivered to the different services that are to have the data.

A workload is monitored to ascertain what resources are being used and quantitative and qualitative metrics are obtained. Then, weighted average values are built from the metrics.

Evaluation of the metrics can reveal a variety of situations, such as a determination that the tomcat application (from the FIG. 1) is highly dependent on memory processing and has a very low dependency on the file Input/Output (I/O). Identification of this situation can assist in configuring the processing to identify a more fine-grain explanation for the dependency on the memory processing.

It is also noted that a variety of different algorithms can be utilized besides the discussed micro valuation approach for the mapping of the toxicity. For example, algorithms can be used for fuzzy processing, weighted average processing, and/or Bayesian logic processing for purposes of forming or organizing the data to show what conditions are important and when the conditions are important to each workload. This is achievable because of the manner that the techniques herein obtains the metric data to determine what may be wrong in an environment for a particular workload.

Figure 3:
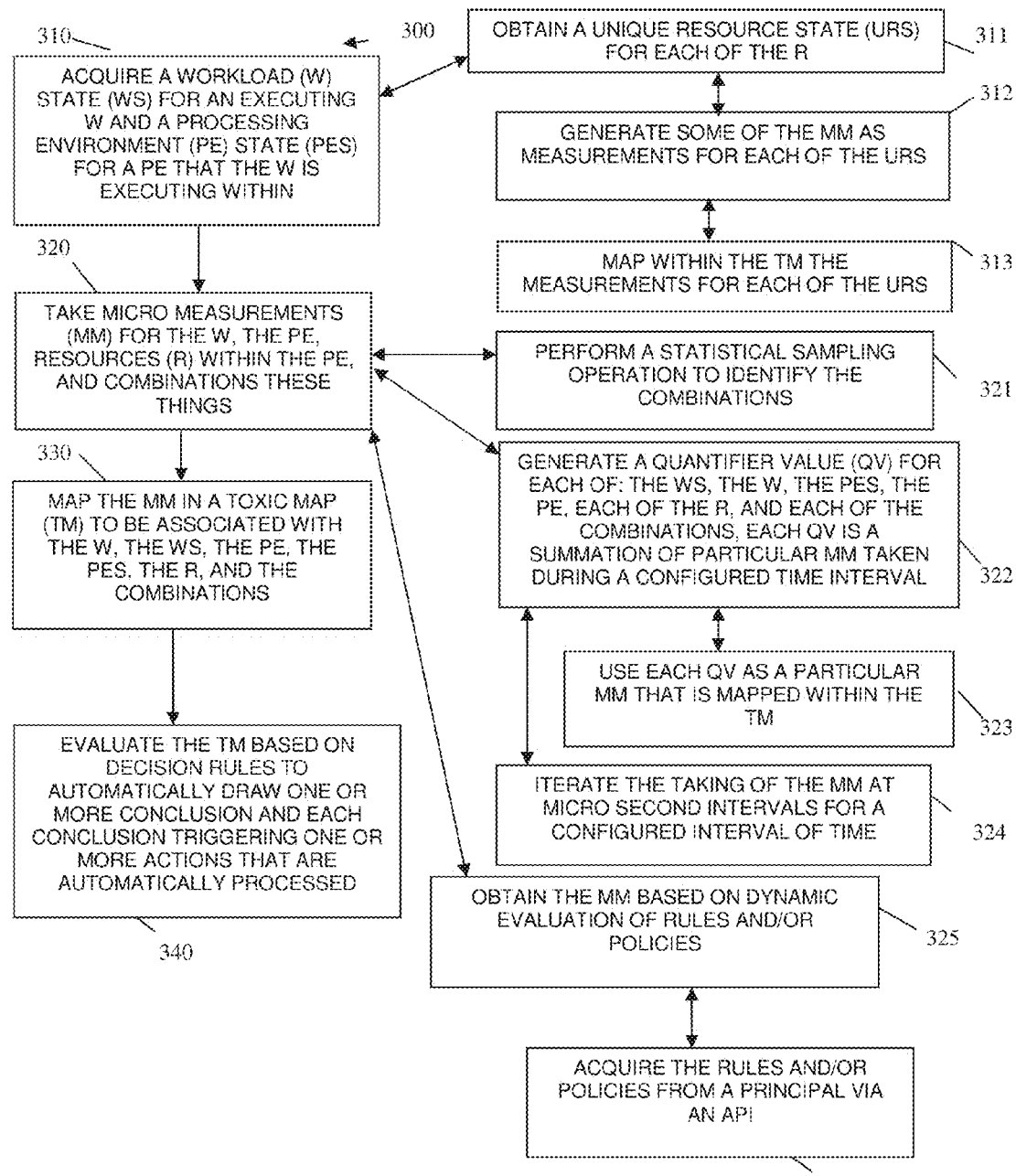
FIG. 3 is a diagram of method for toxic workload mapping, according to an example embodiment.

FIG. 3 is a diagram of a method 200 for toxic workload mapping, according to an example embodiment. The method 300 (hereinafter "toxic mapper") is implemented and resides within a non-transitory computer-readable or processor-readable medium that executes on one or more processors of a network. Moreover, the toxic mapper is operational over a network and the network may be wired, wireless, or a combination of wired and wireless.

It is noted that the toxic mapper can be implemented in a centralized fashion as an agent within a processing environment or can be implemented in a decentralized fashion such that portions of the processing occurs over a variety of applications and devices within or even external to the processing environment.

At 310, the toxic mapper obtains a state for an executing workload and a processing environment state for a processing environment that the workload is being executed within. In an embodiment, the processing environment is a cloud. In one case, the workload is a VM or an application. The state information also provides status as to the health of the workload and the processing environment.

According to an embodiment, at 311, the toxic mapper also obtains a unique resource state for: each resource within the processing environment, each resource used or embedded within the workload, and/or combinations of these. It is also noted that identification as to each resource for which a unique state is obtained can be achieved via: configuration parameters, policy evaluation, a random selection algorithm, or a statistical sampling algorithm.

Continuing with the embodiment of 311 and at 312, the toxic mapper generates some micro measurements (discussed in more detail below with respect to the processing at 320) as specific measurements or metrics for each of the unique resource states. That is, metrics for the state of each resource can be included as some of the micro measurements that are taken at 320.

Still continuing with the embodiment of 312 and at 313, the toxic mapper maps, within a toxic map (discussed below with reference to the processing at 330), the measurements obtained at 320. These mapping occur for each unique resource state. So, as an example, state "R" for resource "r" can include metric values "N" within the toxic map.

At 320, the toxic mapper takes micro measurements for the workload, the processing environment, the resources within the processing environment, and combinations of the workload, the processing environment, and the resources. This can be achieved in a variety of manners.

For example, at 321, the toxic mapper can initially perform a statistical sampling operation to identify specific combinations for which the micro measurements are to be taken. It is noted that any particular combination "C" can be viewed as a relationship. For example, resources R-1, R-2, and workload W can have measurements recorded for relationships: R-1 and R-2; R-1 and W; R-2 and W; R-1, R-2, and W; and so on. So, the toxic mapper can use a statistical sampling algorithm to initially identify the relationships (combinations) that are to have micro measurements captured for.

In another situation, at 322, the toxic mapper generates a quantifier value or an index value for each workload state, workload, processing environment state, processing environment, resource (and resource state as the case may be), and each of the combinations used. The quantifier value or the index value may be calculated in a variety of manners, such as via a summation of particular micro measurements taken during a configured interval of time for a given combination. The summation can also be averaged or weighted to produce each of the quantifier values or index values.

Continuing with the embodiment of 322 and at 323, the toxic mapper uses each quantifier value or index value as a particular micro measurement that is mapped within the toxic map as a particular relationship.

Still continuing with the embodiment of 322 and at 324, the toxic mapper iterates the taking of the micro measurements at micro second intervals for a configured interval of time.

It is noted that with respect to the usage of the phrase "interval of time" in the embodiments of 322-324, the interval can be resolved or configured based on events and policy evaluation or it can be predefined via operating parameters.

In yet another situation, at 325, the toxic mapper obtains the micro measurements based on dynamic evaluation or rules and/or policies. That is, conditions are dynamically evaluated based on events to determine when the micro measurements are to be obtained.

Continuing with the embodiment of 325 and at 326, the toxic mapper acquires some or all of the rules and/or policies from a principal, via an Application Programming Interface (API). In one instance, the principal is an automated application. In another instance, the principal is an end-user. The API provides a mechanism for communicating, identifying, and/or defining some or all of the rules and/or policies, which are used to take the micro measurements.

It is also noted that the specific metrics associated with the micro measurements can be dynamically resolved via policy and/or rules or can be predefined, or even a combination of being predefined and being dynamically resolved. Some example metrics included, by way of example only, I/O operations, page faults, cache hits/misses, processing cycles, memory load, internal machine temperature, response time for a particular action, and so on.

At 330, the toxic mapper maps the micro measurements in a toxic map that is to be associated with the workload, the workload state, the processing environment, the processing environment state, the resources, the unique resource states (as the case may be), and the selected combinations of these things. So, the toxic map can be represented as a table, a database, a user-defined data structure and the like where each relationship (relationship can also include a singular relationship, such as just the workload) and its corresponding captured micro measurements are retrievable.

According to an embodiment, at 340, the toxic mapper evaluates the toxic map based on decision rules to draw conclusions and each conclusion capable of triggering one or more actions that are to be automatically processed. This embodiment is discussed more completely below with reference to the FIG. 4.

Figure 4:
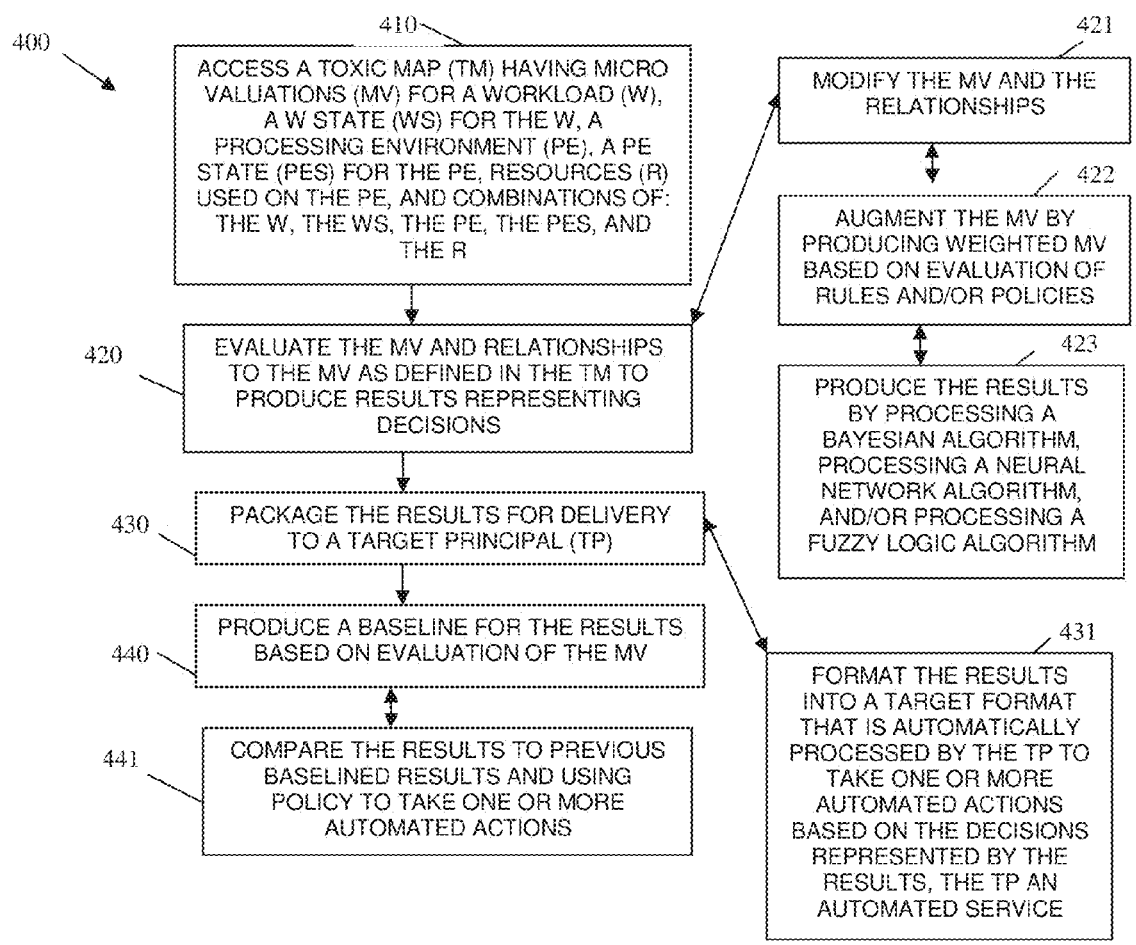
FIG. 4 is a diagram of another method for toxic workload mapping, according to an example embodiment.

FIG. 4 is a diagram of another method 400 for toxic workload mapping, according to an example embodiment. The method 400 (hereinafter "results packager") is implemented and resides within a non-transitory computer-readable or processor-readable medium that executes on one or more processors of a network. Moreover, the results packager is operational over a network and the network may be wired, wireless, or a combination of wired and wireless.

The results packager utilizes the toxic mapping processing represented by the toxic mapper of the FIG. 3 and packages metrics gathered by the toxic mapper for delivery to consuming applications, services, and/or systems.

At 410, the results packager accesses a toxic map having micro valuations for a workload, a workload state of the workload, a processing environment, a processing environment state for the processing environment, resources used in the processing environment, and combinations of these things.

The decision or the processing that triggers the acquisition of the toxic map can be achieved in a variety of circumstances. For instance, results from evaluating and mining the toxic map can come from a principal (end user or automated service). In another case, dynamic policy evaluation or dynamic event handling may trigger acquisition of the toxic map for evaluation. In other cases, conditions predefined as processing parameters can trigger the acquisition as set times or intervals. Other situations can occur as well that trigger the initial acquisition of the toxic map for evaluation and mining by the results packager.

It is also noted that the definition of "micro valuations" were provided above with reference to the FIGS. 1 and 2. In some cases, the micro valuations may also be viewed as the micro measurements discussed with reference to the FIG. 3.

At 420, the results packager evaluates the micro valuations and relationships to the micro valuations (combinations of resources within the processing environment and a single resource may be viewed as a singular relationship to itself) as defined in the toxic map for purposes of producing results, which represents decisions or conclusions drawn from evaluating the toxic map.

In an embodiment, at 421, the results packager modifies the micro valuations and the relationships.

For example, at 422, the results packager augments the micro valuations by producing weighted micro valuations based on evaluation of rules and/or policies. Thus, a particular relationship can receive a higher weighted micro valuation based on past experience or history associated with that relationship.

Continuing with the embodiment of 422 and at 423, the results packager produces the results by processing a Bayesian algorithm, processing a neural network algorithm, and/or processing a fuzzy logic algorithm. In other words, algorithms can mine the relationships and micro valuations based on past baselined or training circumstances to produce future predicted results or to make real-time decisions.

At 430, the results packager packages the results for delivery to a target principal for consumption or usage.

In some cases, the principal is an end-user, such as an administrator or manager of an enterprise. In other cases, the principal is an automated application that receives the results in a format that the automated application can understand for purposes of taking actions on the results.

In an embodiment, at 431, the results packager formats the results into a target format that is capable of being automatically processed by the target principal to take one or more automated actions based on the decisions, which are represented by the results. This is a situation where the principal is an automated service.

According to an embodiment, at 440, the results packager produces a baseline for the results based on evaluation of the micro valuations and the relationships defined in the toxic map. Here, the baseline can serve as a template or model for future situations that are to be evaluated.

Continuing with the embodiment of 440 and at 441, the results packager compares the results to previous baselined results using policy to take one or more automated actions. So, for example, a previous baselined result may be similar (based on scoring or other schemes) to the existing results, such that prior actions or model actions defined with the baselined results are to occur with the current results.

Figure 5:
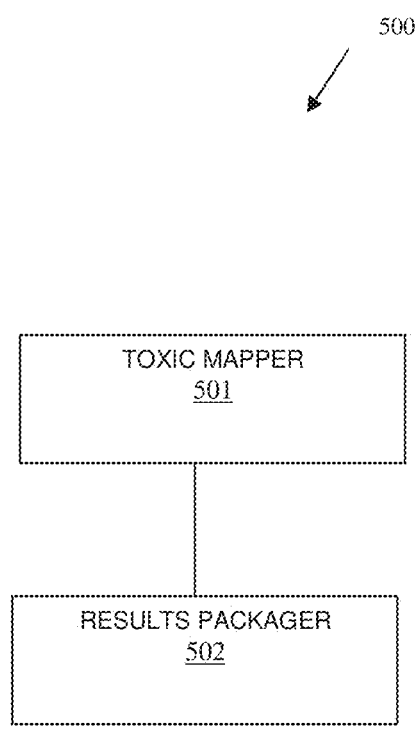
FIG. 5 is a diagram of a toxic mapping system, according to the techniques presented herein.

FIG. 5 is a diagram of a toxic mapping system 500, according to the techniques presented herein. The components of the toxic mapping system 500 are implemented within and reside within a non-transitory and computer or processor-readable storage medium for purposes of executing on one or more processors of a network. The network may be wired, wireless, or a combination of wired and wireless.

The toxic mapping system 500 implements, inter alia, various aspects of the FIGS. 1-2, and the methods 300 and 400 of the FIGS. 3 and 4, respectively.

The toxic mapping system 500 includes: a first processor configured with a toxic mapper 501; and the first processor or a second different processor configured with a results packager 502. Each of these components and their interactions with one another will now be discussed in detail.

The toxic mapper 501 is implemented in a non-transitory computer-readable storage medium having one or more processors. Example aspects and processing associated with the toxic mapper 501 were presented above with reference to the FIGS. 1 and 3.

The toxic mapper 501 configured to take micro valuations of: a workload, a workload state for the workload, a processing environment, a processing environment state for the processing environment, resources within the processing environment, and combinations of these things. The micro valuations can be predefined or dynamically defined via schema definitions that are evaluated. The micro valuations are measurements/metrics taken at the micro second time interval, which may or may not include additional enhanced processing, such as weighted, averaged, and the like.

The results packager 502 is implemented in a non-transitory computer-readable storage medium having one or more processors. Example aspects and processing associated with the results packager 502 were presented above with reference to the FIGS. 2 and 4.

The results packager 502 is configured to modify the micro valuations and derive automated decisions based on evaluations of the micro valuations. The evaluation occurs via dynamic evaluation of policies and/or rules. Moreover, the results packager 502 is further configured to package the decisions and deliver the decisions to a target principal for automated action by the target principal. These situations were also described above with reference to the FIGS. 1-4.

According to an embodiment, the results packager 502 is further configured to use the policies in view of previous automated decisions associated with previously modified and recorded micro valuations. So, predictions can be made based on past situations and resulting decisions. Trends can also be derived.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
obtaining, by a processor, metrics for a workload, resources of the workload, a processing environment that processes the workload, and other resources of the processing environment by sampling micro performance values in microsecond intervals of different combinations of the workload, the resources, the processing environment, and the other resources, and wherein the workload is a Virtual Machine (VM);
wherein obtaining further includes obtain at least some of the metrics as a time for response made by an external service when the external service is presented with a request, and wherein the request is at least part of the workload;
storing, by the processor, the metrics in a toxic map;
mapping the micro measurements in the toxic map, wherein the toxic map is represented as a data structure associated with the workload, a workload state, the processing environment, a processing environment state, the resources, and the different combinations;
generating an index value for each workload, workload state, processing environment, processing environment state, resource, and each of the different combinations used;
mining, by the processor, the toxic map using the index values and identifying in response to the mining at least one performance problem with one or more of: the workload, the resources, the processing environment, the other resources, and one or more of the different combinations;
producing a baseline for results based on evaluation of the micro performance values; and
comparing the results to previous baselined results using policy and take one or more automated actions;
processing at least one of the automated actions using a load balancer to execute the workload on a different machine from a machine associated with the workload.

2. The method of claim 1, wherein obtaining further includes obtaining measurements reflecting at least some of the metrics at predefined intervals.

3. The method of claim 1, wherein obtaining further includes obtaining the workload state for the workload reflecting at least one of the metrics.

4. The method of claim 1, wherein obtaining further includes obtaining a status for the processing environment reflecting at least one of the metrics.

5. The method of claim 1, wherein mapping further includes mapping each metric to a unique resource associated with that metric.

6. The method of claim 5, wherein mapping further includes mapping each metric to a unique resource state for that unique resource.

7. The method of claim 1, wherein mining further includes evaluating a policy and processing decisions rules when mining the metrics to identify conditions mapped to the at least one performance problem.

8. A method, comprising:
evaluating, by a processor, metrics captured for: a workload, a processing environment that processes the workload, resources of the workload, and other resources of the processing environment over a network for identifying relationships between: the workload, the processing environment, the resources, and the other resources, wherein evaluating further includes sampling micro values at microsecond intervals for combinations of: the workload, the processing environment, the resources, and the other resources, and wherein the workload is an Operating System (OS) that processes in the processing environment, wherein evaluating further includes obtaining at least some of the metrics as a time for response made by an external service when the external service is presented with a request, and wherein the request is at least part of the workload, wherein evaluating further includes producing a baseline for results associated with evaluation of the metrics;

mapping, by the processor, the micro values in a toxic map that is represented by a data structure associated with the workload, a workload state, the processing environment, a processing environment state, the resources, and the combinations;

generating, by the processing, an index value for each workload, workload state, processing environment, processing environment state, resource, and each of the combinations;

processing, by the processor, decisions based on a policy applied during the evaluating for identifying a performance scenario deemed problematic with one or more of: the workload, the processing environment, the resources, the other resources, and specific ones of the combinations by mining the toxic map using the index values;

providing, by the processor, particular metrics relevant to the performance scenario to a principal operating within the workload;

comparing the results to previous baselined results using a second policy; and performing at least one action from a plurality of automated actions that improves the performance scenario, and processing a particular one of the plurality of automated actions using a load balancer that executes the workload on a different processing environment.

9. The method of claim 8, wherein evaluating further includes weighting the metrics in response to rules processed during the evaluation.

10. The method of claim 8, wherein evaluating further includes capturing the metrics at regular intervals of time.

11. The method of claim 8, wherein evaluating further includes mapping each metric to a particular resource of the workload.

12. The method of claim 8, wherein evaluating further includes mapping at least some metrics to resources associated with the processing environment and unrelated to the workload.

13. The method of claim 8, wherein providing further includes packaging the metrics relevant to the performance scenario in a principal-defined format for delivery to the principal.

14. A system, comprising:
a processor; and
a mapper configured to:
i) execute on the processor, ii) take metrics at predefined microsecond intervals from: a) a workload represented by a Virtual Machine (VM) or Operating System (OS) that processes in a processing environment over a network, b) the processing environment, c) resources of the workload, and d) other resources of the processing environment by sampling, at a micro second level, performance values from the metrics for combinations of: the workload, the processing environment, the resources, and the other resources, iii) obtain at least some of the metrics as a time for response made by an external service when the external service is presented with a request and the request is at least part of the workload, and produce a baseline for results based on an evaluation of the performance values, iv) store the metrics in a toxic map, v) map the performance values in the toxic map, wherein the toxic map is a data structure associated with the workload, a workload state, the processing environment, a processing environment state, the resources, and the combinations, vi) generate an index value for each workload, workload state, processing environment, processing environment state, resource, and each of the combinations, and vii) process a policy and decision rules to mine the toxic map using the index values and the toxic map to identify a performance scenario with one or more of: the workload, the processing environment, the resources, and the other resources, and viii) compare the results to previous baselined results using a second policy and process one of a plurality of automated actions to improve the performance scenario, and process at least one of the plurality of automated actions using a load balancer that executes the workload on a different processing environment.

15. The system of claim 14, wherein the automated action is a notification sent to a principal regarding the performance scenario and those metrics determined to be relevant to the performance scenario.

* * * * *